(12) United States Patent
Kageyama et al.

(10) Patent No.: US 8,545,156 B2
(45) Date of Patent: Oct. 1, 2013

(54) SCREW TIGHTENING STRUCTURE, SCREW AND SCREW TIGHTENING TOOL

(75) Inventors: Akihiro Kageyama, Toyokawa (JP); Kouzou Yamamoto, Toyokawa (JP)

(73) Assignee: OSG System Products Co., Ltd., Toyokawa-Shi (JP)

( * ) Notice: Subject to any disclaimer, the term of this patent is extended or adjusted under 35 U.S.C. 154(b) by 68 days.

(21) Appl. No.: 13/377,953

(22) PCT Filed: Jun. 24, 2009

(86) PCT No.: PCT/JP2009/061509
§ 371 (c)(1),
(2), (4) Date: Dec. 13, 2011

(87) PCT Pub. No.: WO2010/150369
PCT Pub. Date: Dec. 29, 2010

(65) Prior Publication Data
US 2012/0099944 A1 Apr. 26, 2012

(51) Int. Cl.
*F16B 35/06* (2006.01)

(52) U.S. Cl.
USPC ............... 411/402; 411/403; 81/52; 81/436; 81/460

(58) Field of Classification Search
USPC ............... 411/402, 403, 404; 81/52, 436, 81/460, 475
See application file for complete search history.

(56) References Cited

U.S. PATENT DOCUMENTS

| | | | | |
|---|---|---|---|---|
| 2,046,840 A | * | 7/1936 | Phillips et al. | 81/460 |
| 2,285,460 A | * | 6/1942 | Purtell | 411/404 |
| 2,285,461 A | * | 6/1942 | Purtell | 411/403 |
| 2,369,852 A | * | 2/1945 | Purtell | 81/460 |
| 2,369,853 A | * | 2/1945 | Purtell | 81/460 |
| 2,764,197 A | * | 9/1956 | Torresen | 81/460 |
| 2,848,024 A | * | 8/1958 | Smith et al. | 81/460 |
| 2,969,250 A | * | 1/1961 | Kull | 403/350 |
| 3,108,623 A | * | 10/1963 | Muenchinger | 81/460 |

(Continued)

FOREIGN PATENT DOCUMENTS

| | | |
|---|---|---|
| GB | 1 491 515 | 11/1977 |
| JP | 50-68156 | 6/1975 |

(Continued)

OTHER PUBLICATIONS

International Search Report issued in International Patent Application No. PCT/JP2009/061509 dated Jul. 28, 2009.

(Continued)

*Primary Examiner* — Roberta Delisle
(74) *Attorney, Agent, or Firm* — Oliff & Berridge, PLC

(57) ABSTRACT

A screw tightening structure includes an indented concave recess formed on a screw, and mating convex sections provided on a screw tightening tool for tightening the screw: the recess and the mating convex sections including three or more torque transfer portions, respectively, which protrude outward and are disposed at equiangular intervals for concentrically mating engagements; rotating the screw tightening tool causing the torque transfer portions of the mating convex sections to transfer a tightening torque to the screw via the torque transfer portions of the recess; under which outer circumferential edge portions of the torque transfer portions of the mating convex sections to be brought into abutting contact with sidewall of the torque transfer portions of the recess with the tightening torque being transferred to the screw via force application points Q representing resulting abutment portions.

20 Claims, 10 Drawing Sheets

(56) References Cited

U.S. PATENT DOCUMENTS

| | | | | |
|---|---|---|---|---|
| 3,872,904 A | * | 3/1975 | Barlow | 81/460 |
| 5,019,080 A | * | 5/1991 | Hemer | 606/104 |
| 5,207,132 A | | 5/1993 | Goss et al. | |
| 5,279,190 A | | 1/1994 | Goss et al. | |
| 5,291,811 A | * | 3/1994 | Goss | 81/460 |
| 5,641,258 A | * | 6/1997 | Sala | 411/404 |
| 6,158,310 A | * | 12/2000 | Goss et al. | 81/121.1 |
| 7,111,531 B1 | * | 9/2006 | Suzuki | 81/460 |
| 7,188,554 B2 | * | 3/2007 | Baynham | 81/436 |
| 2002/0029665 A1 | * | 3/2002 | Hughes et al. | 81/460 |
| 2003/0159551 A1 | * | 8/2003 | Hughes | 81/460 |
| 2006/0266168 A1 | * | 11/2006 | Pacheco | 81/460 |
| 2007/0101835 A1 | * | 5/2007 | Totsu | 81/460 |

FOREIGN PATENT DOCUMENTS

| | | |
|---|---|---|
| JP | A-05-118313 | 5/1993 |
| JP | A-07-019611 | 1/1995 |
| JP | B1-3026965 | 3/2000 |
| JP | A-2009-008134 | 1/2009 |

OTHER PUBLICATIONS

Jun. 26, 2013 Office Action issued in Russian Patent Application No. 2012102268 (w/ English Translation).

* cited by examiner

FIG.1(a)
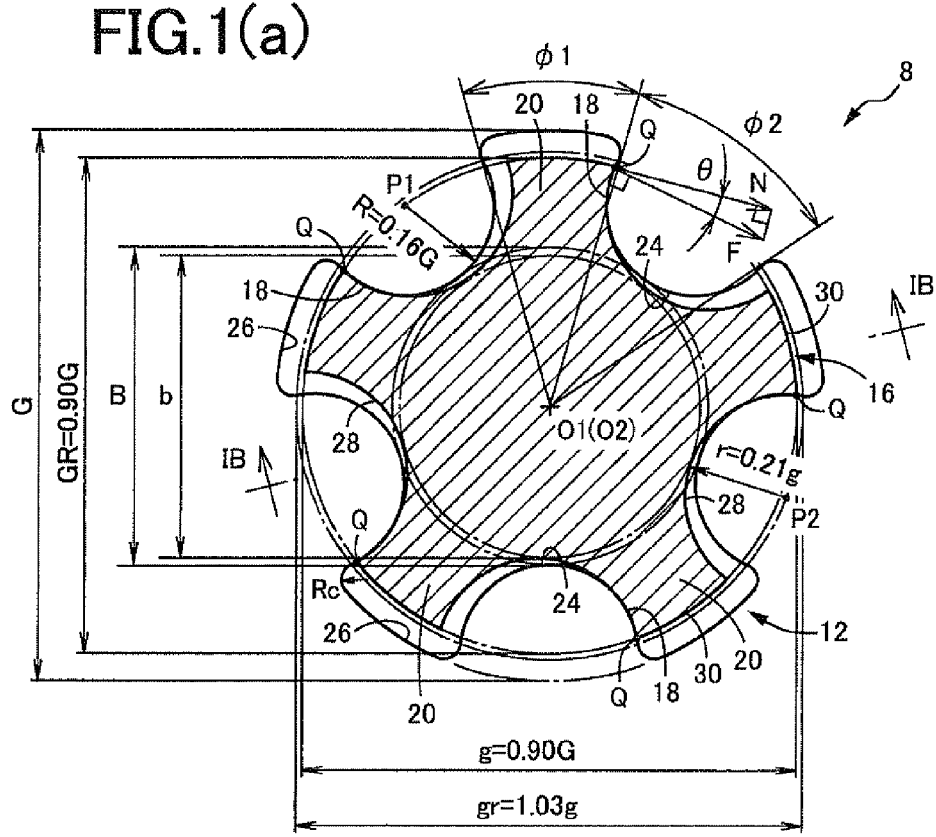
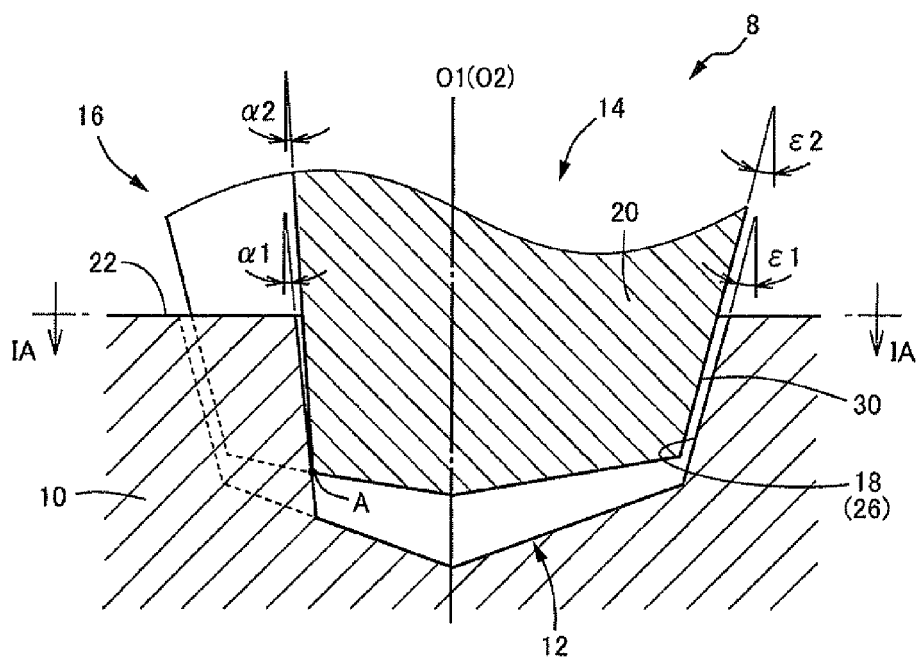
FIG.1(b)

FIG.2

| DRIVING ANGLE θ (°) | F/N |
|---|---|
| ±0 | 1.0000 |
| −5 | 1.0038 |
| −10 | 1.0154 |
| −15 | 1.0353 |
| −20 | 1.0642 |
| −24.6 | 1.0999 |
| −25 | 1.1034 |
| −30 | 1.1547 |

FIG. 3(a) DRIVING ANGLE θ
| R \ GR | 0.85G | 0.90G | 0.95G |
|---|---|---|---|
| 0.10G | −20.7° | −6.4° | +8.4° |
| 0.15G | −19.2° | −9.6° | ±0° |
| 0.20G | −20.1° | −12.8° | −5.4° |
| 0.25G | −22.0° | −16.1° | −10.1° |
| 0.30G | −24.5° | −19.5° | −14.3° |
FIG. 3(b) GRAPH
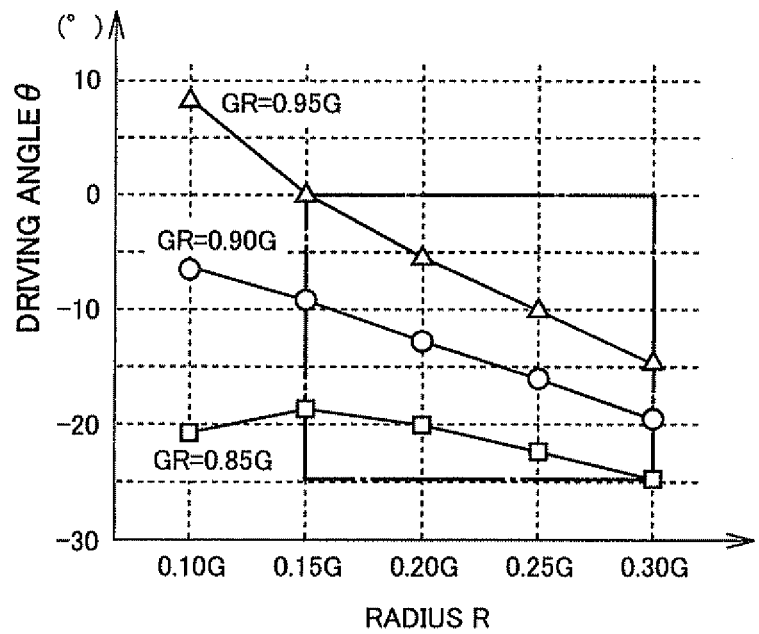

FIG. 4(a) THREE GROOVES

| R \ GR | 0.85G | 0.90G | 0.95G |
|---|---|---|---|
| 0.10G | 0.788 | 0.778 | 0.800 |
| 0.15G | 0.680 | 0.680 | 0.693 |
| 0.20G | 0.563 | 0.572 | 0.587 |
| 0.25G | 0.449 | 0.463 | 0.480 |
| 0.30G | 0.334 | 0.351 | 0.372 |

FIG. 4(b) FOUR GROOVES

| R \ GR | 0.85G | 0.90G | 0.95G |
|---|---|---|---|
| 0.10G | 0.720 | 0.717 | 0.733 |
| 0.15G | 0.568 | 0.573 | 0.591 |
| 0.20G | 0.418 | 0.429 | 0.449 |
| 0.25G | 0.266 | 0.283 | 0.307 |
| 0.30G | NG | 0.135 | 0.163 |

FIG. 4(c) FIVE GROOVES

| R \ GR | 0.85G | 0.90G | 0.95G |
|---|---|---|---|
| 0.10G | 0.647 | 0.646 | 0.667 |
| 0.15G | 0.460 | 0.467 | 0.489 |
| 0.20G | 0.272 | 0.286 | 0.311 |
| 0.25G | NG | 0.104 | 0.133 |
| 0.30G | NG | NG | NG |

FIG. 4(d) SIX GROOVES

| R \ GR | 0.85G | 0.90G | 0.95G |
|---|---|---|---|
| 0.10G | 0.557 | 0.575 | 0.600 |
| 0.15G | 0.337 | 0.360 | 0.387 |
| 0.20G | 0.110 | 0.143 | 0.173 |
| 0.25G | NG | NG | NG |
| 0.30G | NG | NG | NG |

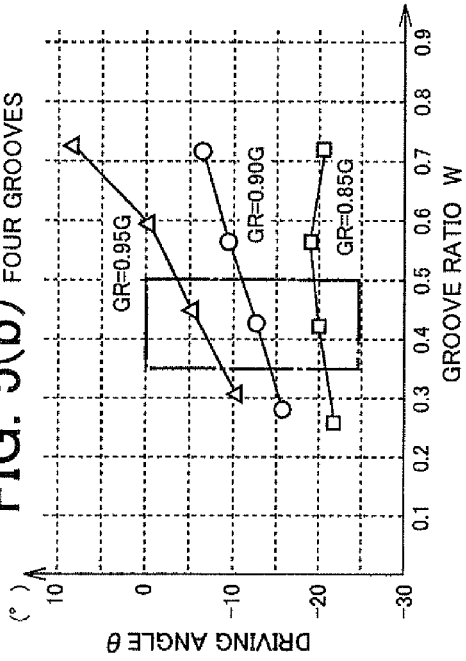
FIG. 5(a) THREE GROOVES
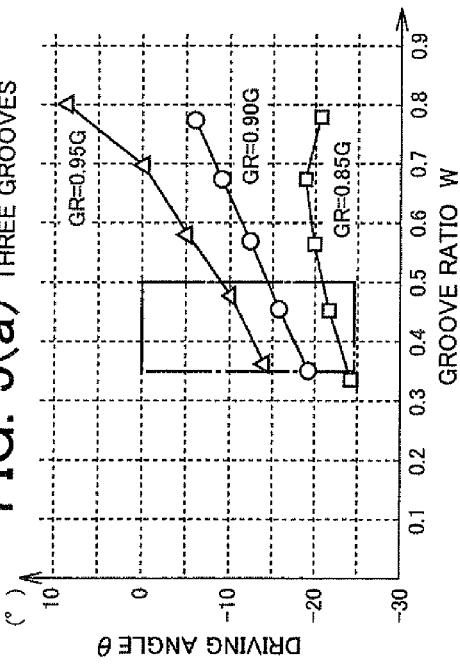
FIG. 5(b) FOUR GROOVES
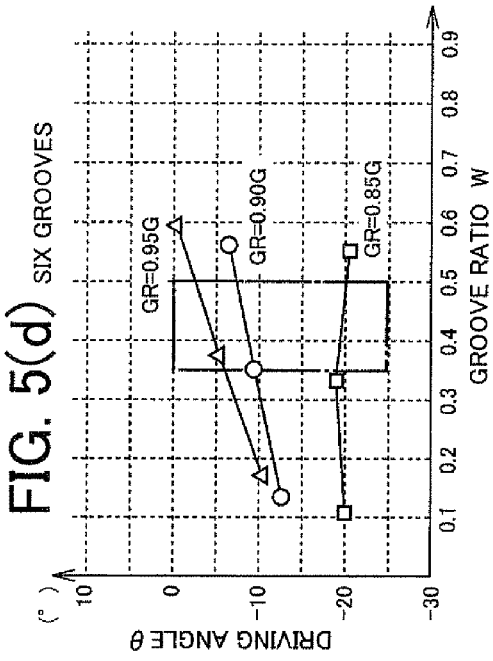
FIG. 5(c) FIVE GROOVES
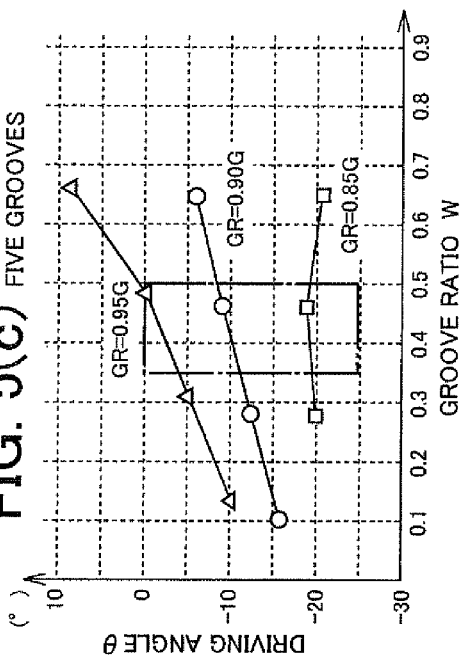
FIG. 5(d) SIX GROOVES

FIG. 6(a)  r

| | r |
|---|---|
| R=0.15G | 0.17g |
| R=0.20G | 0.22g |
| R=0.25G | 0.28g |
| R=0.30G | 0.33g |

FIG. 6(b)  gr

| | gr |
|---|---|
| GR=0.85G | 0.94g |
| GR=0.90G | 1.00g |
| GR=0.95G | 1.06g |

US 8,545,156 B2

SCREW TIGHTENING STRUCTURE, SCREW AND SCREW TIGHTENING TOOL

FIELD OF THE INVENTION

This invention relates to screw tightening structures and, more particularly, to a screw and a screw tightening tool whose come-out is suppressed to prevent the occurrence of deformation of a recess and damages and wears, etc., of a mating convex sections while making it possible to easily tighten the screw with increased tightening torque.

BACKGROUND OF THE INVENTION

Screw tightening structures have been widely known which include: (a) an indented concave recess provided on a screw, and mating convex sections provided on a screw tightening tool; (b) the recess and the mating convex sections including three or more torque transfer portions, respectively, which protrude outward at equiangular intervals for concentrically mating engagement; and (c) wherein rotating the screw tightening tool causes the torque transfer portions of the mating convex sections to transfer a tightening torque to the screw via the torque transfer portions of the recess (see Patent Publications 1 and 2).

FIG. 10 shows an example of such a screw tightening structure in a case wherein a recess 102, provided on a head of a screw 100, and a mating convex sections 106 of a screw tightening tool 104 include three torque transfer portions 108 and 110, respectively, all of which are located concentrically with center lines O1 and O2 of the screw 100 and the screw tightening tool 104, respectively. With the recess 102 and the mating convex sections 106 held in mating engagement with each other in a concentric relation, further, the screw tightening tool 104 is caused to rotate clockwise about the center line O2. This causes outer circumferential edge portions of the torque transfer portions 110 of the three mating convex sections 106 to be brought into abutting contact with side wall face of the torque transfer portions 108 of the recess 102, respectively, with tightening torque being transferred to the screw 100 via force application points Q representing resulting abutment portions. The force application points Q are present at opening end portions (on positions of a paper sheet of FIG. 10(a)) at which the recess 102 is open at an end face 112 of the head of the screw 100. The screw tightening tool 104 includes a screw driver or a bit. FIG. 10(a) is a transverse cross-sectional view taken on a plane perpendicular to the center lines O1 and O2 and corresponds to a cross section taken on line XA-XA in FIG. 10(b). FIG. 10(b) is a longitudinal cross-sectional view involving the center lines O1 and O2 and corresponds to a cross section taken on line XB-XB in FIG. 10(a).

PUBLICATIONS ON PRIOR ART

Patent Publications

Patent Publication 1: Japanese Patent No. 3026965
Patent Publication 2: Japanese Patent Application Publication No. 2009-8134

SUMMARY OF THE INVENTION

Problems to be Solved by the Invention

With the screw tightening structure of such a related art, however, the recess 102 has an end face configuration perpendicular to the center line O1 involving the force application point Q. A surface perpendicular force F, acting on the recess 102 in a direction perpendicular to a sidewall surface thereof at the force application points Q are inclined with respect to a tangential direction (oriented in a direction indicated by an arrow N) of the force application point Q with a center on the center line O1 at an angle regarded to be a driving angle θ. Then, the driving angle θ is expressed as 0°<θ with the driving angle θ being regarded to be positive when oriented further outside than the tangential direction. When judging the driving angle θ for Patent Publications 1 and 2 by the drawings thereof, the driving angle θ falls in the order of about +20° in Patent Publication 1 and falls in the order of about +3° in Patent Publication 2. In addition, the arrow N in FIG. 10(a) denotes a force transmitted to the screw 100 as a torque in a tangential direction and is expressed by a formula (1) expressed below using the surface perpendicular force F and the driving angle θ:

$$N = F \cdot \cos \theta \quad (1)$$

When the driving angle θ is positive in the orientation toward the outside, a component force occurs with an effect of causing the recess 102 to relatively escape toward the outer circumferential side at the force application points Q. It is likely for come-out to occur in which the screw tightening tool 104 is drawn off from the recess 102 with a resultant difficulty for increased torque to be applied. In addition, deformation or scraping tends to occur in grooves of the recess 102 or cracking or wearing occurs in the torque transfer portions 110 of the mating convex sections 106 of the screw tightening tool 104.

The present invention has been completed with the above view in mind and has an object to suppress the occurrence of come-out of a screw tightening tool by which the occurrence of deformation of a recess and breakage, etc., of mating convex sections are prevented to enable a screw to be easily tightened with increased tightening torque.

Means for Solving the Problems

To achieve the object, the first aspect of the present invention provides a screw tightening structure (a) comprising an indented concave recess formed on a screw, and mating convex sections provided on a screw tightening tool for tightening the screw (b) the recess and the mating convex sections including three or more torque transfer portions, respectively, which protrude outward and disposed at equiangular intervals for concentrically mating engagements (c) wherein rotating the screw tightening tool causes the torque transfer portions of the mating convex sections to transfer a tightening torque to the screw via the torque transfer portions of the recess (d) under which outer circumferential edge portions of the torque transfer portions of the mating convex sections to be brought into abutting contact with sidewall of the torque transfer portions of the recess with the tightening torque being transferred to the screw via force application points Q representing resulting abutment portions (e) whereby in a cross-sectional shape or an end face configuration of the recess on a plane perpendicular to a center line O1 of the recess and involving the force application points Q, a surface perpendicular force F, perpendicular to a sidewall of the recess at the force application point Q, is oriented in a direction at a driving angle θ, representing an angle that is inclined with respect to a tangential direction of the force application point Q with a center on the center line O1, which is expressed as θ≤0° with the driving angle θ being oriented outward from the tangential direction and assigned to be positive; (f) in the cross-sectional shape or the end face configuration of the recess on the plane perpendicular to a center line O1 of the recess and involving the force application points Q, the three or more torque transfer portions of the recess being connected to each other via concave circular arc contours having circular arc each with a radius R which form a part of or a whole of sidewalls of the torque transfer portions; (g) the radius R falling in a range expressed as 0.15 G≤R≤0.30 G when G represents an outer diameter of the torque transfer portion of the recess, and the center point P1 of the concave circular arc contours each with the radius R being located at a circumference of a circle of a center-point diameter GR falling in a range expressed as 0.85 G≤GR≤0.95 G with the center line O1 as a center point such that the force application points Q are present on the concave circular arc contours having a diameter in a range from 0.87 G to 0.93 G with the center line O1 as a center point, respectively; (h) outer circumferential walls of the torque transfer portions of the recess having circular arc configurations on the outer diameter G and the outer circumferential walls and the concave circular arc contours in areas closer to the force application points Q being smoothly connected to each other via circular arcs each with a radius Rc and having the relationship Rc<(G−GR)/2.

The fourth aspect of the invention provides the screw tightening structure recited in the first aspect of the invention, wherein in the cross-sectional shape or the end face configuration of the recess on the plane perpendicular to a center line O1 of the recess and involving the force application points Q, an angle θ1 between the torque transfer portions of the recess and a separate angle θ2 of the torque transfer portions satisfy a relationship 0.35<W<0.50 when assumed the torque transfer portions have a ratio W=θ1/(θ1+θ2).

The fifth aspect of the invention provides the screw tightening structure recited in the fourth aspect of the invention, wherein the force application points Q are present in the recess at an opening end portion thereof, wherein the outer diameter G, the radius R, the center-point diameter GR and the angles θ1 and θ2 indicate dimensions of the recess at the opening end portion thereof.

The seventh aspect of the invention provides the screw tightening structure recited in any one of the first, fourth and fifth aspects of the invention, wherein in the cross-sectional shape or the end face configuration of the mating convex sections on the plane perpendicular to a center line O2 of the mating convex sections and involving the force application points Q, the three or more torque transfer portions of the mating convex sections are connected to each other via concave circular arc contours each in a circle or an ellipse which form a part of or a whole of sidewalls of the torque transfer portions.

The eighth aspect of the invention provides the screw tightening structure recited in any one of the first, fourth and fifth aspects of the invention, wherein (a) in the cross-sectional shape or the end face configuration of the mating convex sections on the plane perpendicular to a center line O2 of the mating convex sections and involving the force application points Q, the three or more torque transfer portions of the mating convex sections are connected to each other via concave circular arc contours, each having a radius "r" having a relationship r≥R relative to the radius R, which form a part of or a whole of sidewalls of the torque transfer portions; (b) whereby when "g" represents an outer diameter of the torque transfer portions of the mating convex sections, the radius "r" falls in a range expressed as 0.17 g≤r≤0.33 g under which the center point P2 of the concave circular arc contours with the radius "r" is located on the circumference of a circle of the center-point diameter "gr" falling in a range of 0.94 g≤gr≤1.06 g with a center on the center line O2; and the concave circular arc contours have edge portions, placed closer to the force application points Q, which reach the force application points Q.

The ninth aspect of the invention provides the screw tightening structure recited in the eighth aspect of the invention, wherein the outer diameter "g" of the torque transfer portions of the mating convex sections falls in a range expressed as 0.87 G≤g≤0.93 G.

The tenth aspect of the invention provides the screw tightening structure recited in the eighth or ninth aspect of the invention, wherein in the cross-sectional shape or the end face configuration of the mating convex sections on the plane perpendicular to a center line O2 of the mating convex sections and involving the force application points Q, the torque transfer portions of the mating convex sections have outer circumferential walls formed in circular arc shape each with the outer diameter "g", respectively, with corner portions at which the outer circumferential walls and the concave circular arc contours intersects each other serving as the force application points Q in abutting contact with sidewall surfaces of the torque transfer portions of the recess.

The eleventh aspect of the invention provides the screw tightening structure recited in any one of the first, fourth, fifth and seventh to tenth aspects of the invention, wherein (a) the recess has a minimum diameter portion, placed between the plural torque transfer portions, which is inclined toward a bore bottom at an inclination angle α1 of 7° or less so as to approach the center line O1 of the recess; (b) the mating convex section has a minimum diameter portion, placed between the plural torque transfer portions thereof, which is inclined toward a distal at an inclination angle α2 of 7° or less so as to approach the center line O2 of the mating convex section; (c) and a distal end of the minimum diameter portion of the mating convex section is caused to engage a midway of the minimum diameter portion of the recess in the relationships expressed as α2≤α1 and α1−α2≤3° under which the tightening torque is transferred.

The twelfth aspect of the invention provides the screw tightening structure recited in the eleventh aspect of the invention, wherein (a) the maximum diameter portions of the torque transfer portions of the recess which are inclined toward a bore bottom at an inclination angle ϵ1 of 15° or less so as to approach the center line O1 of the recess; (b) the maximum diameter portions of the torque transfer portions of the mating convex sections are inclined toward a distal end at an inclination angle ϵ2 of 15° or less so as to approach the center line O2 of the mating convex portions (c) with ϵ1=ϵ2.

The thirteenth aspect of the invention provides the screw tightening structure recited in any one of the first, fourth, fifth and seventh to twelfth aspects of the invention, wherein (a) the driving angle θ falls in a range of −24.6°≤θ≤0° and (b) the number of the torque transfer portions of each of the recess and the mating convex sections is any one of 3, 4, 5 and 6.

The fourteenth aspect of the invention provides a screw including the recess recited in any one of the first, fourth, fifth and seventh to thirteenth aspects of the invention.

The fifteenth aspect of the invention provides a screw tightening tool including the mating convex sections recited in any one of the first, fourth, fifth and seventh to thirteenth aspects of the invention.

ADVANTAGEOUS EFFECTS OF THE INVENTION

With the screw tightening structure of the first aspect of the present invention, the outer circumferential edge portions of the torque transfer portions of the mating convex sections are brought into abutting contact with the sidewall surfaces of the torque transfer portions of the recess. This allows tightening torque to be transferred to the screw via the force application points Q resulting from such abutment portions. When this takes place, the driving angle θ of the surface perpendicular force F, present on the plane perpendicular to the sidewall of the recess at such force application points Q is arranged to fall in the relationship expressed as θ≤0° to be regarded as being positive when oriented further outward than the tangential direction in the cross-sectional shape or the end face configuration of the recess on the plane perpendicular to a center line O1 of the recess and involving the force application points Q. This results in the occurrence of the surface perpendicular force F applied to the sidewall of the recess in the tangential direction or radially inward than the same with the center on the center line O1. This results in less likelihood for the screw tightening tool to encounter come-out of escaping from the recess than a situation (0°<θ) under which the force is applied to the sidewall of the recess in a direction oriented radially outward in the related art. This results in suppression of deformation of the recess and damages or wears, etc., of the mating convex sections, while making it possible for the screw to be relatively easily tightened with increased tightening torque. If θ<0°, especially, a component force occurs in a direction causing the sidewall of the recess to be pulled inward with the mating convex sections having increased likelihood of biting the recess with further appropriate suppression of come-out in a remarkable effect.

With the second aspect of the present invention, the three or more torque transfer portions of the recess are connected to each other by means of circular- or oval-shaped concave circular-arc contours. In addition, the concave circular-arc contours form the sidewalls of the torque transfer portions such that the force application points Q are present on the concave circular-arc contours, respectively. Thus, appropriately determining a radius R of those concave circular-arc contours or the center point P1 enables the driving angle θ of the surface perpendicular force F at the force application point Q to be set to be 0° or less. Since the concave circular-arc contours are formed in circular arcs each with the radius R, it is possible to easily obtain the tangential direction, etc., of the force application point Q upon calculations. Further, this makes it possible to easily perform the calculation on shape design of the recess such that the driving angle θ is set to be a predetermined angle of 0° or less.

The radius R falls in the range of 0.15 G≤R≤0.30 G and the center point P1 of the concave circular-arc contours each with the radius R is located on the circumference of a circle with the center-point diameter GR falling in the range of 0.85 G≤GR≤0.95 G and the force application points Q are present on the concave circular arc contours having a diameter in a range from 0.87 G to 0.93 G with the center line O1 as a center point, respectively, it enables the driving angle θ of the surface perpendicular force F to be set to be 0° or less. Under such a situation, the driving angle θ may be preferably determined to fall in the range of −24.6°≤θ≤0° under which the ratio of F/N, i.e., F/F cos θ=1/cos θ between the surface perpendicular force F and the force N at the force application point Q in the tangential direction falls in a range of 1.0 to 1.10, thereby enabling a transfer loss of torque, caused by the driving angle θ, to be suppressed within a range of 10% or less. The outer circumferential walls of the torque transfer portions of the recess are formed in the circular arc configurations each with the outer diameter G, and the outer circumferential walls and the concave circular-arc contours at the force application points Q are smoothly connected to each other in a circular arc with a predetermined radius Rc. Thus, when forming the recess in depression with the use of a punch, the recess 12 can be appropriately formed with higher precision than that achieved when corners remain sharpened, and durability of the punch is improved.

With the fourth aspect of the present invention, the torque transfer portions (groove portions) of the recess has a ratio W falling in a range expressed as 0.35<W<0.50. This makes it possible to determine so as to allow the radius R and the center-point diameter GR to satisfy the requirement of the numeric ranges in the third aspect of the invention such that the driving angle θ is able to fall in the range of −24.6°≤θ≤0°. In general, moreover, the screw tightening tool is made of material having higher strength than that of the screw. Therefore, adjusting the ratio W of the torque transfer portions of the recess to be less than 0.50 allows the recess to have strength in balance with that of the screw tightening tool with resultant suppression of deformation, etc., of the recess, while enabling the screw to be tightened with large tightening torque.

With the seventh aspect of the invention, the three or more torque transfer portions of the mating convex sections are connected to each other by means of circular- or oval-shaped concave circular-arc contours each by which a part of or a whole of the sidewalls of the torque transfer portions is formed. Thus, setting the size and the center point (the center point P2 of the concave circular-arc contours) of the circular arc of the concave circular-arc contour allows the outer circumferential side edge portions of the torque transfer portions of the mating convex sections to be brought into abutting contact with the sidewall surfaces of the torque transfer portions of the recess. This enables tightening torque to be transferred to the screw at the force application points Q representing such abutment portions. Further, it becomes possible to easily perform the calculations on shape design of the mating convex sections in consideration of the shape of the recess.

The eighth aspect of the present invention contemplates the provision wherein the concave circular-arc contours have circular arcs each with a radius "r" which is associated with the radius R in the relationship expressed as r≥R. With the torque transfer portions of the mating convex sections having an outer diameter "g", the radius "r" falls within a range expressed as 0.17 g≤r≤0.33 g, the center point P2 of the concave circular-arc contour with the radius "r" is located on the circumference of the circle with the center-point diameter "gr" falling in the range of 0.94 g≤gr≤1.06 g and the end portions of the concave circular-arc contours reach the force application points Q, i.e., the outer circumferential side edge portions of the torque transfer portions in configurations similar to the recess. This makes it possible to easily perform the shape design of the mating convex sections so as to allow the outer circumferential side edge portions of the torque transfer portions of the mating convex sections to be brought into abutting contact with the sidewall surfaces of the torque transfer portions of the recess.

With the ninth aspect of the present invention, due to the torque transfer portions of the mating convex sections being arranged to have the outer diameter "g" 0.87 G≤g≤0.93 G relative to the outer diameter G of the torque transfer portions of the recess, the outer circumferential side edge portions of the torque transfer portions of the mating convex sections are brought into abutting contact with the sidewall surfaces of the torque transfer portions of the recess of which the outer circumferential walls and the concave circular-arc contours are connected to each other in circular arcs each with a predetermined radius Rc, and, accordingly, the torque can be appropriately transmitted. In addition, the outer diameter "g" is 0.87 G or more and this allows the outer circumferential side edge portions of the torque transfer portions of the mating convex sections to be brought into abutting contact with the outer circumferential side portions (in an area outside 0.87 G) of the torque transfer portions of the recess. This makes it possible to tighten the screw with large tightening torques, resulting in a reduction of the surface perpendicular force F, provided that torque remains with the same magnitude, for thereby suppressing the deformation of the recess and damage to and wear, etc., of the mating convex sections.

The range of such an outer diameter "g" is determined upon supposing that the position of the force application point Q, relative to the outer diameter G of the recess in the generally used screw tightening structure, is about 0.9 G with respect to the outer diameter G of the recess 12 and set to be 0.87 G≤g≤0.93 G in consideration of errors in stage production.

With the tenth aspect of the present invention, the torque transfer portions of the mating convex sections have outer circumferential walls each formed in the circular arc shape with the outer diameter "g" to provide the force application points Q at the corner portions at which the outer circumferential walls and the concave circular-arc contours intersect each other which are brought into abutting contact with sidewalls of the torque transfer portions of the recess. This enables the force application points Q to be located in areas closer to the outer circumferential sides of the torque transfer portions of the recess to be as close as possible. This enables the screw to be tightened with large tightening torque as those of the ninth aspect of the present invention, resulting in a reduction of the surface perpendicular force F, provided that torque remains with the same magnitude, for thereby suppressing the deformation of the recess and damage to and wear, etc., of the mating convex sections.

The eleventh aspect of the present invention is a case where the distal ends of the minimum diameter portions of the mating convex sections arranged to engage the midways of the minimum diameter portion of the recess. The minimum diameter portions have the inclination angles of α1 and α2 which are set to be 7° or less to fall in the relationships expressed as α2≤α1 and α1−α2≤3°. This results in the occurrence of large static friction between both components to cause the screw to be easily retained (adhered) to the screw tightening tool, thereby making it possible for a robot to automatically tighten the screw.

With the twelfth aspect of the present invention, the maximum diameter portions of the recess and the mating convex sections have the inclined angles ε1 and ε2 which are set to be 15° or less, respectively, with ε1=ε2. This allows the recess and the mating convex sections to be press formed in a forging process in the existence of draft angles resulting from the inclined angles ε1 and ε2, thereby easily enabling the formation with high precision.

With the thirteenth aspect of the present invention, the driving angle θ of the surface perpendicular force F falls in the range of −24.6°≤θ≤0°. This is less likely to encounter the occurrence of come-out. This suppresses the occurrence of deformation of the recess and damage or wear, etc., of the mating convex sections, while making it possible to tighten the screw with large tightening torque in a relatively easy fashion. In addition, the ratio of F/N between the surface perpendicular force F and the force N at the force application point Q in the tangential direction falls in a range of 1.0 to 1.10, thereby enabling a transfer loss of torque, caused by the driving angle θ, to be suppressed within a range of 10% or less.

A screw recited in the fourteenth aspect of the present invention and a screw tightening tool recited in the fifteenth aspect of the present invention substantially are possible to have the same advantageous effects as those of the screw tightening structure recited in the first, fourth, fifth and seventh to tenth aspects of the present invention.

BRIEF DESCRIPTION OF THE DRAWINGS

FIG. 1 is a view, showing a screw tightening structure in the case of five torque transfer portions of one embodiment according to the present invention, FIG. 1(a) corresponds to a cross section taken on line IA-IA of FIG. 1(b) and FIG. 1(b), representing a longitudinal cross-sectional view involving the center lines O1 and O2, corresponds to a cross section taken on line IB-IB of FIG. 1(b).

FIG. 2 is a view showing the relationship between the ratio F/N between the surface perpendicular force F and the tangential force N, and the driving angle θ.

FIG. 3 is a view explaining the result on searching the relationship between the center-point diameter GR of a circumference of a circle, at which the radius R of the mating convex sections of the recess and the center point P1 are located, and the driving angle θ, FIG. 3(a) is representing in a table, and FIG. 3(b) is representing in a graph.

FIG. 4 is a view explaining the result on searching the relationship between the center-point diameter GR of a circumference of a circle, at which the radius R of the mating convex sections and the center point P1 are located, and the ratio W of torque transfer portions (grooved portions) with respect to the recess having three grooves to six grooves.

FIG. 5 represents graphs with the calculation results of FIG. 4.

FIG. 6 is a view showing the value converted the radius R with respect to the recess and the center-point diameter GR to the radius "r" and the center-point diameter "gr" with respect to the mating convex sections in the case the outer diameter "g" of the mating convex sections being 0.9 G relative to the outer diameter G of the recess.

BEST MODE FOR CARRYING OUT THE INVENTION

Figure 7:
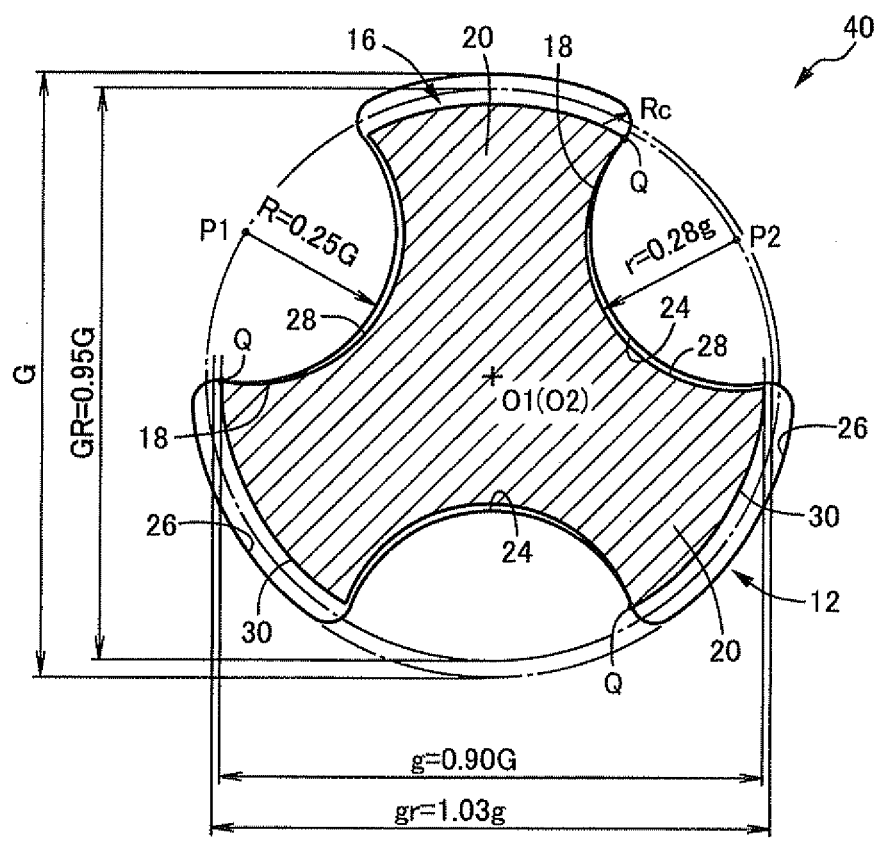
FIG. 7 is a view explaining the embodiment, wherein the torque transfer portions are formed in three components, which represents a cross-sectional view corresponding to FIG. 1(a).

A recess has a shape in a cross section or an end face to be perpendicular to a center line O1 of the recess involving force application points Q. This is determined depending on the force application points Q such that, if a screw tightening tool has mating convex sections protruding outward from the recess, for instance, the force application points Q are usually present at opening edge portions of the recess. This means that the recess has an end face configuration. If the mating convex sections of the screw tightening tool are buried inside the recess, then, the force application points Q are usually present at upper end face portions of the mating convex sections such that the force application points Q are present at intermediate portions of the recess along a depth direction. This means that the recess takes a cross-sectional configuration. In a seventh aspect of the present invention, shapes of the mating convex sections on a plane perpendicular to the center line O2 of the mating convex sections involving the force application points Q, take cross-sectional shapes or end face configurations depending on positions at which the force application points Q are placed. In addition, the force application points Q are not necessarily located at one point but may be likely to be continuously present on a linear order along, for instance, the depth direction of the recess. Although the subject matter of the present invention may preferably be satisfied in a whole of such ranges, any one of the force application points Q may suffice to satisfy the subject matter of the present invention.

It may suffice for a driving angle $\theta$ to be 0° or less. However, there are increasing likelihoods that the greater the driving angle $\theta$ oriented toward a negative side, the greater will be the value of F/N with a resultant increase in transfer loss of torque while tightening torque is required to be ±10% or less in precision. Thus, it is preferred for the transfer loss of torque to be suppressed to a level of 10% or less and, in order to achieve such requirements, a need arises for the driving angle $\theta$ to be −24.6° or more. Further, since torque control may also be possible to be performed in consideration of such a transfer loss, it is possible to adopt a screw tightening structure having the driving angle $\theta$ falling below −24.6°. If the driving angle $\theta$ is set to be, for instance, $-17° \leq \theta \leq 0°$, the transfer loss of torque can be suppressed to be of 5% or less. If $\theta < 0°$, a component force occurs in a direction to pull a sidewall of the recess inward with a resultant suppression of come-out in a further appropriate fashion. Thus, the driving angle $\theta$ will be appropriately determined in consideration of such transfer loss and come-out, etc.

The present invention contemplates to cause surface perpendicular forces F, present at the force application points Q occurring when the screw is tightened in abutting contact, to have the driving angle $\theta$ to be 0° or less. In order to have similar advantageous effects even when untightening the screw, the recess and the mating convex sections and the torque transfer portions may be preferably formed in symmetric shapes in circumferential directions about the center line O1 and O2. Due to different required torques for the tightening side and the untightening side, however, these may be formed in asymmetric shapes.

The mating convex sections include torque transfer portions which may be preferably formed in connection to each other by means of circular- or oval-shaped concave circular arc contours like those of a seventh aspect of the present invention but may take other various shape than the circular arc contours. In particular, the mating convex sections may suffice to be brought into abutting contact with the recess at predetermined force application points Q with no direct relationship with the driving angle $\theta$ and it may be relatively easy to perform contour designs or the like. Also, various design techniques may be performed even for the seventh aspect of the present invention, wherein the torque transfer portions are connected to each other by means of the circular- or oval-shaped concave circular arc contours, including: manufacturing various test pieces with structures different in size of the circular arcs and the positions of the center points; and making contour designs in try and errors, etc.

With a fourth aspect of the present invention, the torque transfer portions (groove portions) of the recess have a ratio W falling in a range of 0.35<W<0.50. The ratio W may be appropriately determined depending on materials of the screw. In case of a screw made of, for instance, stainless steel or non-iron metal in general use, the screw is relatively weaker than the screw tightening tool. Therefore, it is preferable for the ratio W to be relatively small in an order as low as, for instance, 0.35 to 0.40. In case of a screw made of, for instance, alloy steel with high strength, it is preferable for the ratio W to fall in an order as high as 0.40 to 0.50 in consideration of a balance with the screw tightening tool in strength thereof. Depending on conditions, the ratio W can be determined in an order beyond the numeric ranges mentioned above. The mating convex sections of the screw tightening tool also have shapes that are appropriately determined depending on the shape of the recess.

An eighth aspect of the present invention contemplates to determine ranges of the radius "r" and the center-point diameter "gr" in association with the recess configuration, defined in the first aspect of the present invention, as a premise based on the screw tightening tool in general use: in which the force application points Q are located on the circumference of a circle in the order of 0.9 G with the center on the center line O1. In implementing the seventh aspect of the present invention, moreover, it is possible to adopt concave circular arc contours in which, in place of the circular arc with the radius "r", the oval shapes are cut out in part. In implementing the first, fourth or fifth aspect of the present invention, the torque transfer portions can be connected to each other in areas adjacent to the mating convex sections in shape except for the circular arc contours formed in the circle or oval shape.

A ninth aspect of the present invention contemplates to allow the outer diameter "g" of the mating convex sections to fall in a range expressed as $0.87 \text{ G} \leq g \leq 0.93 \text{ G}$ for the outer diameter G of the recess on supposition that the generally used screw tightening structure has the force application points Q lying on the circumference of a circle in the order of 0.9 G with the center on the center line O1; in which it is preferable to fall the relationship expressed as g=0.9 G but may be possible for the outer diameter "g" to be determined beyond the numerical range noted above depending on needs.

A tenth aspect of the present invention contemplates the provision of mating convex sections which include: torque transfer portions having outer circumferential walls formed in circular arc shapes each with an outer diameter "g"; in which the force application points Q lay at corner portions at which the outer circumferential walls and the concaved circular arc contours intersect with each other. However, various appropriate modifications may be possibly implemented including steps of: connecting the outer circumferential walls and the concaved circular arc contours by means of predetermined circular arcs and chamfered flat surfaces or the like; and forming the outer circumferential walls in flattened surfaces, etc.

With an eleventh aspect and a twelfth aspect of the present invention, the recess and the mating convex sections have minimum diameter portions or maximum diameter portions which are inclined at inclination angles of $\alpha 1$, $\alpha 2$, $\epsilon 1$ and $\epsilon 2$ with respect to the center lines Q1 and Q2. In an alternative, however, a recess or mating convex sections may be formed in straight shapes parallel to the center lines Q1 and Q2. Only either one of the recess and the mating convex sections may also be formed in the straight form. Moreover, in terms of adhesiveness and forging formability or the like, the inclination angles $\alpha 1$ and $\alpha 2$ may preferably fall in a range from about 3° to 7° and the inclination angles $\epsilon 1$ and $\epsilon 2$ may preferably fall in a range from about 10° to 15°. In addition, the inclination angles $\alpha 1$, $\alpha 2$, $\epsilon 1$ and $\epsilon 2$ may also be determined to go beyond the numeric ranges defined in the eleventh aspect and the twelfth aspect of the present invention or may also be possible to fall in the relationships expressed as $\alpha1>\alpha2$ and $\epsilon1\neq\epsilon2$.

The present invention may be appropriately applied to a case wherein the number of torque transfer portions of the recess and the mating convex sections includes 3 to 6 but may also be applied to another case wherein the number of torque transfer portions is 7 or more. According to the present invention, further, deformation of the recess and damages or wears, etc., of the mating convex sections can be suppressed with a capability of tightening the screw with large tightening torque, resulting in an advantageous effect of enabling a component part to be made of material at low cost provided that the same tightening torque is provided.

EMBODIMENTS

Hereunder, embodiments of the present invention will be described below in detail with reference to the accompanying drawings.

FIG. 1 is a view, showing a screw tightening structure 8 of one embodiment according to the present invention in which a recess 12, formed on a head of a screw 10 in an indented concave shape, and mating convex sections 16, provided on a screw tightening tool 14, include five torque transfer portions 18 and 20, respectively, which: protrude toward respective outer circumferential peripheries at equiangular intervals, respectively; and are provided in concentric relation with center lines O1 and O2 of the screw 10 and screw tightening tool 14. The screw tightening tool 14 is rotated clockwise about the center line O2 with the recess 12 and the mating convex sections 16 engaged in concentric relation with each other. This causes outer circumferential edge portions of the five torque transfer portions 20 of the mating convex sections 16 to be brought into abutting contact with sidewalls of the torque transfer portions 18 of the recess 12, respectively, such that tightening torque is transferred to the screw 10 through force application points Q representing relevant abutment portions. The force application points Q are present at opening edge portions (at positions on a surface of a sheet of FIG. 1(a)) in which the recess 12 is open to an end face 22 of the head of the screw 10. It is preferable for the force application points Q to linearly extend toward a distal end (in a lower area in FIG. 1(b)) of the screw tightening tool 14. The screw tightening tool 14 takes the form of a screw driver or a bit, etc. FIG. 1(a) is a cross section perpendicular to the center lines O1 and O2, and corresponds to a cross section taken on line IA-IA of FIG. 1(b) and FIG. 1(b), representing a longitudinal cross-sectional view involving the center lines O1 and O2, corresponds to a cross section taken on line IB-IB of FIG. 1(a).

Now, the recess 12 has a shape defined as follows. In an end face configuration of the recess 12 on a plane perpendicular to the center line O1 involving the force application point Q, a surface perpendicular force F, oriented on a plane perpendicular to the sidewall of the recess 12 at the force application point Q, is directed such that: when an angle, inclined with respect to a tangential direction (i.e., a direction, indicated by an arrow N in FIG. 1(a)) of the force application point Q with a center on the center line O1, is regarded to be a driving angle $\theta$, the driving angle $\theta$ falls in a range expressed as $-24.6°\leq\theta\leq0°$ with the driving angle $\theta$, orientated radially outward than the tangential direction, being treated to be positive. That is, in an end face configuration of the recess 12 shown in FIG. 1(a), the five torque transfer portions (grooved portions) 18 of the recess 12 are connected to each other by means of concave circular arc contours 24 each with a radius R such that: a nearly whole of the sidewalls of the torque transfer portions 18 are formed of such concave circular arc contours 24. Assuming the torque transfer portions 18 of the recess 12 have an outer diameter G, further, the radius R falls in a range expressed as $0.15\ G\leq R\leq0.30\ G$ under which the center point P1 of the concave circular arc contours 24 each with the radius R lies at the circumference of a circle of a center point diameter GR falling a range of $0.85\ G\leq GR\leq0.95\ G$ with a center on the center line O1; and the concave circular arc contours 24 extend to areas slightly exceeding the force application points Q such that the force application points Q are present at the concave circular arc contours 24.

Figure 10A:
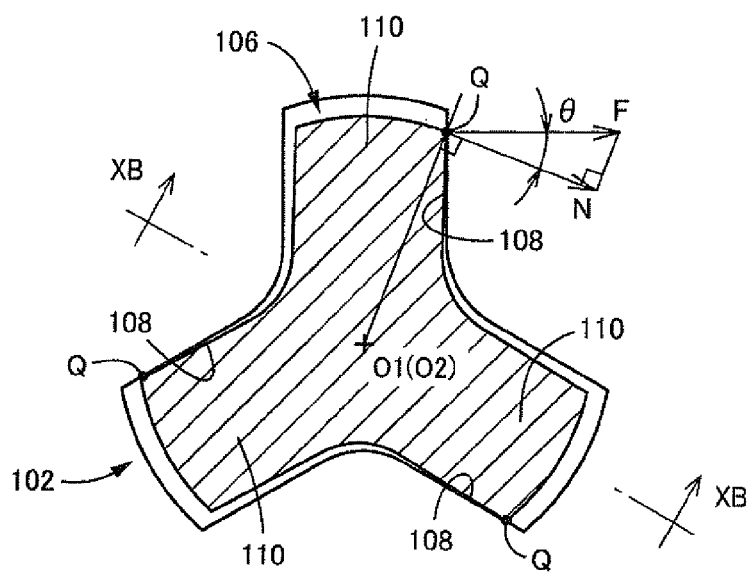
FIG. 10 is a view explaining an example of the screw tightening structure in the related art, which represents a cross-sectional view corresponding to FIG. 1.
Figure 10B:
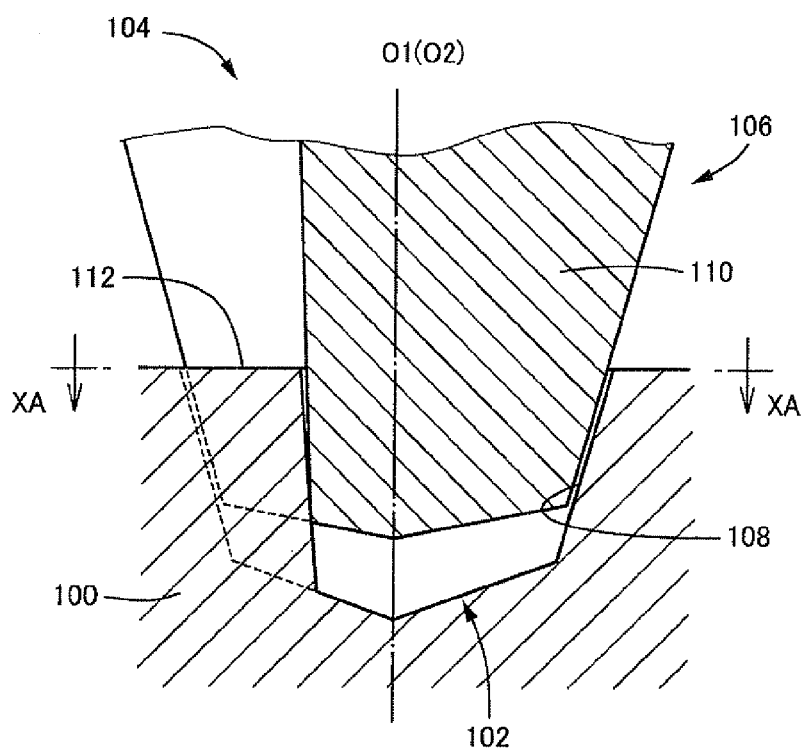

With the driving angle $\theta$ set to be 0° or less, it is less likely for the screw tightening tool 14 to escape from the recess 12 in come-out than a situation (see FIG. 10) under which the surface perpendicular force F is oriented radially outward (with $0°<\theta$) like a situation encountered in the related art. However, the greater the deviation of the driving angle $\theta$ toward a negative side, the greater will be the ratio F/N between the surface perpendicular force F and the tangential force N acting at the force application point Q. This results in an increase in transfer loss of torque. There is an increasing likelihood for tightening torque to be required in precision of ±10% or less. In the present embodiment, therefore, the driving angle $\theta$ is set to be −24.6° or more to allow the ratio F/N to be 1.10 or less such that the transfer loss of torque is 10% or less. FIG. 2 is a view showing the relationship between the driving angle $\theta$ and F/N. As shown in equation (1), the tangential force N is expressed in terms of $F\cdot\cos\theta$, therefore $F/N=1/\cos\theta$. In addition, the driving angle $\theta$ is appropriately determined in consideration of the likelihood of inducing transfer loss and come-out, etc. With the driving angle $\theta$ set to be, for instance, $-17°\leq\theta\leq0°$, the transfer loss of torque can be lowered to be 5% or less.

Further, the center-point diameter GR, at which the radius R and the center point P1 are located, has a numeric range determined such that the driving angle $\theta$ falls in the range of $-24.6°\leq\theta\leq0°$ upon supposing that the force application points, i.e., the diametric dimensions of outer circumferential side edge portions of the torque transfer portions 20 of the mating convex sections 16 fall in the same value of 0.90 G as that of a generally used screw tightening structure. More particularly, it is turned out that the driving angle $\theta$ can be set to the range of $-24.6°\leq\theta\leq0°$ provided that $0.15\ G\leq R\leq0.30\ G$ and $0.85\ G\leq GR\leq0.95\ G$ are satisfied. This is achieved by: appropriately determining the radius R and the center-point diameter GR as shown in FIG. 3; and obtaining the force application point Q, i.e., the driving angle $\theta$ of the surface perpendicular force N at the position of 0.9 G. A range, encircled by a single dot line in a graph of FIG. 3(b), represents a region in which the radius R falls in the range expressed as $0.15\ G\leq R\leq0.30\ G$ and the driving angle $\theta$ falls in the range of $-24.6°\leq\theta\leq0°$. The relationship among such a radius R, the center-point diameter GR and the driving angle $\theta$ is established regardless of the number (the number of grooves) of the torque transfer portions 18. As will be apparent from the graph of FIG. 3(b), it becomes possible to allow the driving angle $\theta$ to fall in the range of $-24.6°\leq\theta\leq0°$ even in the occurrence of the radius R present beyond the limits of $0.15\ G\leq R\leq0.30\ G$ and the center-point diameter GR present beyond the limits of GR $0.85\ G\leq GR\leq0.95\ G$.

In the present embodiment, the radius is expressed as R=0.16 G and the center-point diameter is expressed as GR=0.90 G as shown in FIG. 1. Suppose the force application point Q, i.e., the diametric dimensions of the outer circumferential side edge portions of the torque transfer portions 20 of the mating convex sections 16 have the same value of 0.90

G as that of the generally used screw tightening structure, the driving angle θ is expressed as θ≅−10°.

For the end face configuration of the recess 12 shown in FIG. 1(a), meanwhile, the angle φ1 between the torque transfer portions 18 of the recess 12 with the center on the center line O1 and a separate angle φ2 of the torque transfer portions 18 are determined so as to satisfy the relationship expressed as 0.35<W<0.50 when assuming the torque transfer portions 18 have a ratio (hereinafter, referred to as a "groove ratio") of W=φ1/(φ1+φ2). The groove ratio W is determined based on material, i.e., strength, of the screw 10 in general. However, the torque transfer portions 18 are likely to vary in shape in the presence of such a groove ratio W. This makes it difficult to determine the shapes of the torque transfer portions 18 in a way to satisfy the conditions in which the radius R and the center-point diameter GR fall in 0.15 G≤R≤0.30 G and 0.85 G≤GR≤0.95 G, respectively. The groove ratio W falls in a range such that the torque transfer portions 18 can have predetermined strengths in consideration of the material, i.e., strength, of the screw 10 being weaker than the screw tightening tool 14, and a shape of the torque transfer portions 18 can be made allowing the radius R and the center-point diameter GR to fall in 0.15 G≤R≤0.30 G and 0.85 G≤GR≤0.95 G, respectively.

FIG. 4 represents Tables indicating the groove ratio W calculated upon varying the radius R and the center-point diameter GR depending on the number of grooves (from three grooves to six grooves) representing the number of the torque transfer portions 18. FIG. 5 represents graphs with the calculation results of FIG. 4 being plotted on two-dimensional coordinates between the groove ratio W and the driving angle θ. Symbol "NG" in Tables of FIG. 4 represents that a shape is not established when the groove ratio W is negative. Ranges, encircled by single dot lines in FIG. 5, represent regions in which the groove ratio W satisfies 0.35<W<0.50 and the driving angle θ satisfies −24.6°≤θ≤0°. From these, it is understood that the shapes of the torque transfer portions 18 can be determined so as to satisfy the conditions of the radius R and the center-point diameter GR in terms of 0.15 G≤R≤0.30 G and 0.85 G≤GR≤0.95 G. Further, the occurrence of the radius R being 0.10 G seems to be appropriate in terms of FIG. 3. Looking at FIGS. 4 and 5, however, it is turned out that in either of the three grooves to six grooves and in any of the values of the center-point diameter ranging from 0.85 G to 0.95 G, the groove ratio W becomes much greater than 0.5 to be inappropriate in terms of strength, etc.

In end face configuration of the recess 12 shown in FIG. 1(a), the torque transfer portions 18 of the recess 12 have outer circumferential walls 26 formed in circular arc shapes, respectively, each having an outer diameter G. The outer circumferential walls 26 are smoothly connected to the concave circular arc contours 24 at the force application points Q in circular arcs each with the radius Rc having the relationship expressed as Rc<(G−GR)/2. The concave circular arc contours 24, each formed in a symmetric shape in an area about the center line O1, are also smoothly connected to the outer circumferential walls 26 in circular arcs each with the radius Rc at an edge portion in opposition to the force application point Q. That is, the force application point Q acts as an abutment portion when the screw 10 is tightened and has an opposite side formed in a similar (symmetric) structure with which the mating convex section 16 engages when loosening the screw 10. This result in the same advantageous effects as those obtained when tightening the screw 10. For the screw tightening tool 14, similarly, the mating convex sections 16 have the torque transfer portions 20, respectively, each of which is formed in a symmetric shape in a circumferential direction of the center line O2.

For the mating convex sections 16 of the screw tightening tool 14, the torque transfer portions 20 have cross-sectional shape on a plane perpendicular to the center line O2 of the mating convex sections 16 involving the force application points Q, i.e., the cross-sectional shape shown in FIG. 1(a) with the outer diameter "g" falling in the range of 0.8 G≤g≤0.93 G relative to the outer diameter G of the recess. The range of such an outer diameter "g" is determined upon supposing that the position of the force application point Q, relative to the outer diameter G of the recess in the generally used screw tightening structure, is about 0.9 G with respect to the outer diameter G of the recess 12 and set to be 0.87 G≤g≤0.93 G in consideration of errors in stage production with g≅0.90 G in the present embodiment. Moreover, the five torque transfer portions (bladed portions) 20 are connected to each other by means of concave circular-arc contours 28 which form entire parts of sidewalls of the torque transfer portions 20, respectively. Radius "r" has the relationship with respect to the radius R in a way to be expressed as r≥R. The concave circular-arc contours 28 have minimum small diameters "b" having the relationship with respect to the minimum small diameter B of the concave circular-arc contours 24 of the recess 12 in such a way to be expressed as b<B. The radius "r" has the relationship with respect to the radius R to fall in a range expressed as 0.17 g≤r≤0.33 g. This allows the concave circular-arc contour 28 of the radius "r" to have the center point P2, which is located on the circumference of a circle of the center-point diameter "gr" falling in a range of 0.94 g≤gr≤1.06 g with a center on the center line O2. That is, converting the radius R=0.15 G to 0.30 G to the radius "r" with g=0.90 G results in r=0.17 g to 0.33 g as shown in FIG. 6(a). Converting the center-point radius GR=0.85 G to 0.95 G to the center-point diameter "gr" results in gr=0.94 g to 1.06 g as shown in FIG. 6(b). In the illustrated embodiment as shown in FIG. 1, when the radius is r=0.21 g, the center-point diameter is greater than R=0.16 G, and the center-point diameter gr=1.03 g is greater than the center-point diameter GR=0.90 G.

In the cross-sectional shape shown in FIG. 1(a), further, the mating convex sections 16 include the torque transfer portions 20 whose outer circumferential walls 30 are formed in circular arc shapes, respectively, each with the outer diameter "g". The outer circumferential wall 30 and the concave circular-arc contour 28 intersect each other at a corner portion which acts as an abutment portion, i.e., the force application point Q, which is brought into abutting contact with the sidewall of the torque transfer portion 18 of the recess 12. That is, the concave circular-arc contours 28 are formed in symmetrical shapes each in a circumferential direction about the center line O2 with both end portions reaching at the outer circumferential edges (with the outer diameter g=0.90 G) of the torque transfer portions 20, respectively, to cross the outer circumferential walls 30 at acute angles.

The minimum diameter portion, i.e., a central portion of each concave circular-arc contour 24, which is present between the plural torque transfer portions 18 of the recess 12, is inclined so as to approach the center line O1 at an inclination angle α1 ranging from 3° to 7° in a direction toward a bottom (downward in FIG. 1(b)) of a hole of the recess 12. The minimum diameter portion, i.e., the central portion of the concave circular-arc contour 28, which is present between the plural torque transfer portions 20 of the mating convex sections 16, is also inclined so as to approach the center line O2 at an inclination angle α2 ranging from 3° to 7° in a direction toward a distal end (downward in FIG.

1(b)) of a hole of the recess 12. The inclination angle α1 and α2 fall in the relationship expressed as α2≤α1 and α1−α2≤3° which is set to be α1−α2≈2° in the present embodiment. This causes the distal end of the minimum diameter portion of the mating convex section 16 to engage a midway of the minimum diameter portion of the recess 12 under which rotating the screw tightening tool 14 clockwise in an area about the center line O2 causes the outer circumferential edges of the torque transfer portions 20 to be brought into abutting contact with the sidewalls of the torque transfer portions 18 of the recess 12 for delivery of tightening torque as shown in FIG. 1(a). A point A in FIG. 1(b) represents a contact point at which the distal end of the minimum diameter portion of the mating convex section 16 engages with the midway of the minimum diameter portion of the recess 12 in adhesion with a relatively large static friction due to the presence of α1−α2≤3°.

Further, the maximum diameter portion of the torque transfer portion 18 of the recess 12, i.e., more particularly, the central portion of the outer circumferential wall 26 in an area about the center line O1, is inclined so as to approach the center line O1 at an inclination angle cl ranging from 10° to 15° in a direction toward the bottom (downward in FIG. 1(b)) of the hole of the recess 12. The maximum diameter portion of the torque transfer portion 20 of the mating convex section 16, i.e., more particularly, the central portion of the outer circumferential wall 30 in an area about the center line O2, is inclined so as to approach the center line O2 at an inclination angle ∈2 ranging from 10° to 15° in a direction toward the distal end (downward in FIG. 1(b)). These inclination angles ∈1 and ∈2 are set to be ∈1=∈2 in the present embodiment.

With such a screw tightening structure 8 of the present embodiment, the outer circumferential side edge portions of the torque transfer portions 20 of the mating convex sections 16 are caused to abut against the sidewall surfaces of the torque transfer portions 18 of the recess 12 with such abutment portions serving as the force application points Q to allow tightening torque to be transferred to the screw 10. Under such a situation, the driving angle θ of the surface perpendicular force F is set to be 0° or less in the end face configuration on a plane perpendicular to the center line O1 of the recess 12 involving the force application points Q. This allows the surface perpendicular force F to be applied to the sidewall of the recess 12 in a tangential direction or inward direction with the center on the center point O1. This causes the screw tightening tool 14 to be less likely to encounter the occurrence of come-out because of escaping from the recess 12 than that encountered when the surface perpendicular force F is directed outward (with 0°=θ) like in the related art. This suppresses the occurrence of deformation of the recess 12 and damage or wear, etc., of the mating convex sections 16, while making it possible to tighten the screw 10 with large tightening torque in a relatively easy fashion. Especially when established to be 0°≤θ, a component force is generated in a direction to pull the sidewall of the recess 12 inward. This causes the mating convex sections 16 to bite into the recess 12, resulting in further suppression of come-out with the advantageous effects being remarkably achieved.

Furthermore, the five torque transfer portions 18 of the recess 12 are connected to each other by means of the concave circular-arc contours 24 each having the radius R. In addition, the concave circular-arc contours 24 form a nearly whole of the sidewalls of the torque transfer portions 18 such that the force application points Q are present on the concave circular-arc contours 24, respectively. Thus, appropriately determining the radius R and the center point P1 of the concave circular-arc contours 24 enables the driving angle θ of the surface perpendicular force F at the force application point Q to be set to be 0° or less. Since the concave circular-arc contours 24 are formed in circular arcs each with the radius R, it is possible to easily obtain the tangential direction, etc., of the force application point Q upon calculations. This makes it possible to easily perform the calculation on shape design of the recess 12 such that the driving angle θ is set to be a predetermined angle of 0° or less.

Moreover, the radius R falls in the range of 0.15 G≤R≤0.30 G and the center point P1 of the concave circular-arc contours 24 each with the radius R is located on the circumference of a circle with the center-point diameter GR falling in the range of 0.85 G≤GR≤0.95 G such that the concave circular-arc contours 24 reach the force application points Q. Meanwhile, the force application points Q are located on the circumference of a circle of about 0.9 G with a center on the center line O1 like the generally used screw tightening structure. This enables the driving angle θ of the surface perpendicular force F to be set to be 0° or less. Under such a situation, the driving angle θ may be preferably determined to fall in the range of −24.6°≤θ≤0° under which the ratio of F/N between the surface perpendicular force F and the force N at the force application point Q in the tangential direction falls in a range of 1.0 to 1.10, thereby enabling a transfer loss of torque, caused by the driving angle θ, to be suppressed within a range of 10% or less.

Further, the recess has the groove ratio W [=φ1/(φ1+φ2) falling in a range expressed as 0.35<W<0.50. This makes it possible to perform shape design so as to allow the radius R and the center-point diameter GR to satisfy the relationships expressed as 0.15 G≤R≤0.30 G and 0.85 G≤GR≤0.95 G such that the driving angle θ is able to fall in the range of −24.6°≤θ≤0°. In general, moreover, the screw tightening tool 14 is made of material having higher strength than that of the screw 10. Therefore, adjusting the groove ratio W of the recess 12 to be less than 0.50 allows the recess 12 to have strength in balance with that of the screw tightening tool 14 with resultant suppression of deformation, etc., of the recess 12, while enabling the screw to be tightened with large tightening torque.

Furthermore, the outer circumferential walls 26 of the torque transfer portions 18 of the recess 12 are formed in the circular arc configurations each with the outer diameter G. The outer circumferential walls 26 and the concave circular-arc contours 24 are smoothly connected to each other in a circular arc with a predetermined radius Rc. Thus, when forming the recess 12 in depression with the use of a punch, the recess 12 can be appropriately formed with higher precision than that achieved when corners remain sharpened, and durability of the punch is improved.

Further, the five torque transfer portions 20 of the mating convex sections 16 are connected to each other by means of the concave circular-arc contours 28 each with the radius "r" by which a whole of the sidewalls of the torque transfer portions 20 is formed. Thus, setting the radius "r" and the center point P2 of the circular arc of the concave circular-arc contour 28 allows the outer circumferential side edge portions of the torque transfer portions 20 of the mating convex sections 16 to be brought into abutting contact with the sidewall surfaces of the torque transfer portions 18 of the recess 12. This enables tightening torque to be transferred to the screw 10 at the force application points Q representing such abutment portions. With the concave circular-arc contours 28 being formed in circular arcs each with the radius "r", it becomes possible to easily perform the calculations on shape design of the mating convex sections 16 in consideration of the shape of the recess 12.

Furthermore, the radius "r" is associated with the radius R in the relationship expressed as r≥R under which within a range expressed as 0.17 g≤r≤0.33 g, the center point P2 of the concave circular-arc contour 28 with the radius "r" is located on the circumference of the circle with the center-point diameter "gr" falling in the range of 0.94 g≤gr≤1.06 g and the end portions of the concave circular-arc contours 28 reach the force application points Q, i.e., the outer circumferential side edge portions of the torque transfer portions 20 in configurations similar to the recess 12. This makes it possible to easily perform the shape design of the mating convex sections 16 so as to allow the outer circumferential side edge portions of the torque transfer portions 20 of the mating convex sections 16 to be brought into abutting contact with the sidewall surfaces of the torque transfer portions 18 of the recess 12.

With the torque transfer portions 20 of the mating convex sections 16 being arranged to have the outer diameter "g" 0.87 G≤g≤0.93 G and the outer circumferential walls 26 of the recess 12 and the concave circular-arc contours 24 are connected to each other in circular arcs each with a predetermined radius Rc. Even under such a situation, the outer circumferential side edge portions of the torque transfer portions 20 of the mating convex sections 16 can be brought into abutting contact with the sidewall surfaces of the torque transfer portions 18 formed of the concave circular-arc contours 24 for appropriate transfer of torque. In addition, the outer diameter "g" is 0.87 G or more and this allows the outer circumferential side edge portions of the torque transfer portions 20 of the mating convex sections 16 to be brought into abutting contact with the outer circumferential side portions (in an area outside 0.87 G) of the torque transfer portions 18 of the recess 12. This makes it possible to tighten the screw 10 with large tightening torques, resulting in a reduction of the surface perpendicular force F, provided that torque remains with the same magnitude, for thereby suppressing the deformation of the recess 12 and damage to and wear, etc., of the mating convex sections 16.

Moreover, the torque transfer portions 20 of the mating convex sections 16 have outer circumferential walls 30 each formed in the circular arc shape with the outer diameter "g" to provide the force application points Q at the corner portions at which the outer circumferential walls 30 and the concave circular-arc contours 28 intersect each other. This enables the force application points Q to be located in areas closer to the outer circumferential sides of the torque transfer portions 18 of the recess 12 to be as close as possible. This enables the screw 10 to be tightened with large tightening torque, resulting in a reduction of the surface perpendicular force F, provided that torque remains with the same magnitude, for thereby suppressing the deformation of the recess 12 and damage to and wear, etc., of the mating convex sections 16.

Further, the distal ends of the minimum diameter portions of the mating convex sections 16 arranged to engage the midways of the minimum diameter portion of the recess 12 to determine mating positions (inserting positions) in an axial direction. The minimum diameter portions have the inclination angles of $\alpha 1$ and $\alpha 2$ which are set to be 7° or less to fall in the relationships expressed as $\alpha 2 \leq \alpha 1$ and $\alpha 1 - \alpha 2 \leq 3°$. This results in the occurrence of large static friction between both components to cause the screw 10 to be easily retained (adhered) to the screw tightening tool 14, thereby making it possible for a robot to automatically tighten the screw 10.

Moreover, the maximum diameter portions of the recess 12 and the mating convex sections 16 have the inclined angles $\epsilon 1$ and $\epsilon 2$ which are set to be 15° or less, respectively, with $\epsilon 1 = \epsilon 2$. This allows the recess 12 and the mating convex sections 16 to be press formed in a forging process in the existence of draft angles resulting from the inclined angles $\epsilon 1$ and $\epsilon 2$, thereby easily enabling the formation with high precision.

Figure 8:
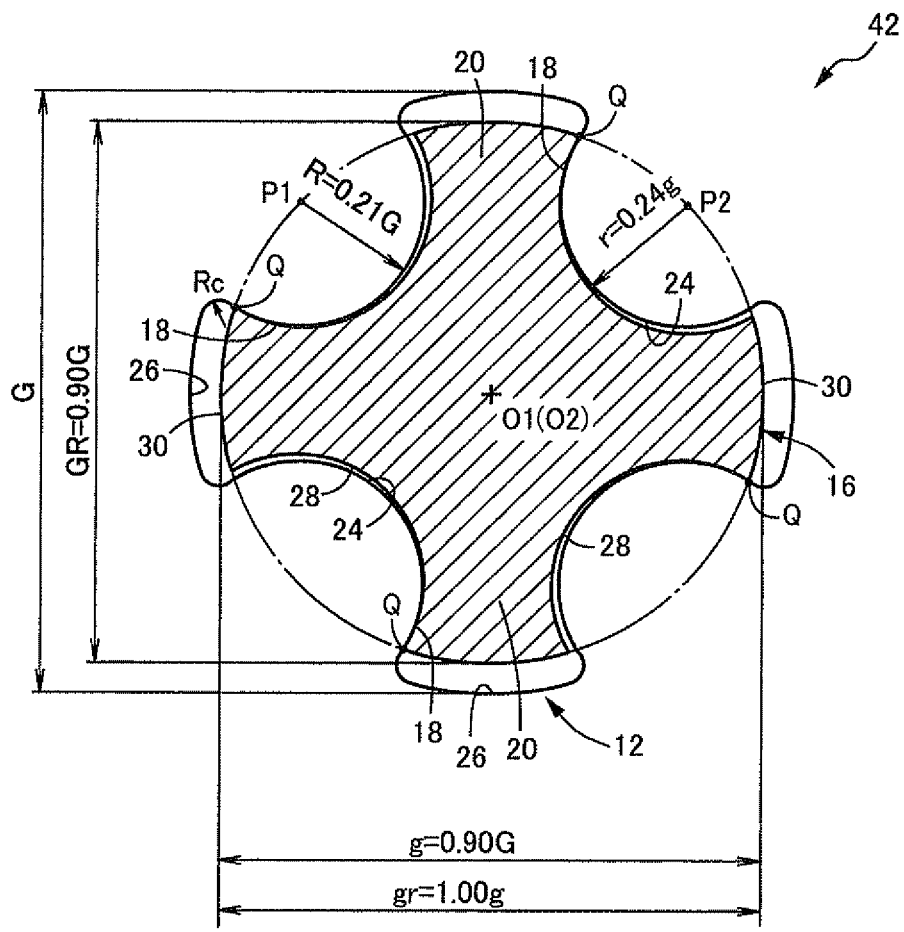
FIG. 8 is a view explaining the embodiment, wherein the torque transfer portions are formed in four components, which represents a cross-sectional view corresponding to FIG. 1(a).
Figure 9:
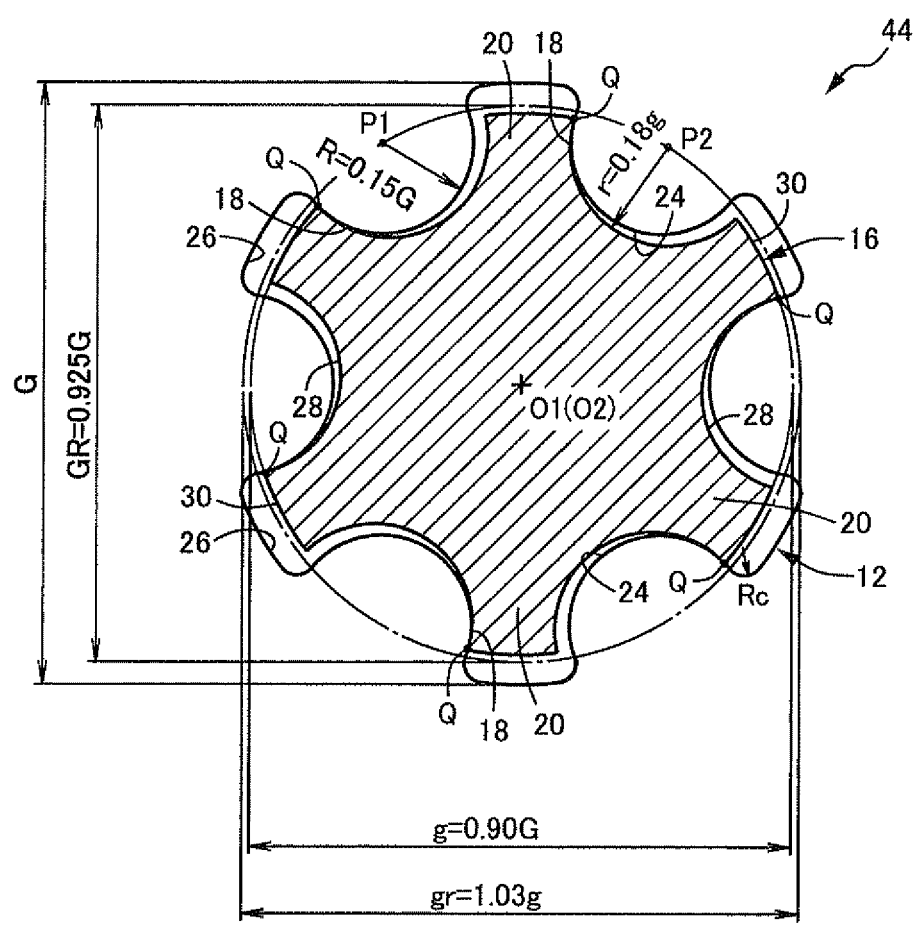
FIG. 9 is a view explaining the embodiment, wherein the torque transfer portions are formed in six components, which represents a cross-sectional view corresponding to FIG. 1(a).

Although the present embodiment is concerned with the recess 12 and the mating convex sections 16, having the torque transfer portions 18 and the torque transfer portions 20, respectively, in the number of five components, the present invention may be also applied to cases where the torque transfer portions 18 and the torque transfer portions 20 are formed in three, four and six components. FIGS. 7 to 9 show embodiments, including the screw tightening structures 40, 42 and 44 wherein the torque transfer portions 18 and the torque transfer portions 20 are formed in three, four and six components, each of which represents a cross-sectional view corresponding to FIG. 1(a). Even in these embodiments, the radius R, the center-point diameter GR, the radius Rc of the corner portions, the groove ratio W and the inclined angles $\alpha 1$ and $\epsilon 1$, related to the recess 12, and the outer diameter "g", the radius "r", the center-point diameter "gr" and the inclined angles $\alpha 2$ and $\epsilon 2$, related to the mating convex sections 16, are determined to have the same parameters as those of the previous embodiment in a structure wherein the driving angle $\theta$ of the surface perpendicular force F at the force application point Q falls in the range of $-24.6° \leq \theta \leq 0°$. Accordingly, it is possible to have the same advantageous effects as those of the previous embodiment. and While the present invention has been described above with reference to the embodiments shown in the drawings, it is intended that the invention described be considered only as illustrative of one embodiment and that the present invention can be implemented in various modifications and improvements based on knowledge of those skilled in the art.

DESCRIPTION OF REFERENCE NUMERALS 8, 40, 42, 44: screw tightening structures, 10: a screw, 12: a recess, 14: a screw tightening tool, 16: mating convex sections, 18: torque transfer portions of a recess 20: torque transfer portions of the mating convex sections, 24: concaved circular-arc contours of the recess, 26: an outer circumferential wall of the recess, 28: concaved circular-arc contours of the mating convex sections, 30: outer circumferential walls of the mating convex sections, O1: a center line of the recess, O2: a center line of the mating convex sections, Q: a force application point, P1: a center point of the concaved circular-arc contours of the recess, P2: a center point of the concaved circular-arc contours of the recess, F: a surface perpendicular force, $\theta$: a driving angle, W: a groove ratio (a ratio of the torque transfer portions)

The invention claimed is:
1. A screw tightening structure comprising an indented concave recess formed on a screw, and mating convex sections provided on a screw tightening tool for tightening the screw:

the recess and the mating convex sections including three or more torque transfer portions, respectively, which protrude outward and are disposed at equiangular intervals for concentrically mating engagements;

rotating the screw tightening tool causing the torque transfer portions of the mating convex sections to transfer a tightening torque to the screw via the torque transfer portions of the recess;

under which outer circumferential edge portions of the torque transfer portions of the mating convex sections to be brought into abutting contact with sidewall of the torque transfer portions of the recess with the tightening torque being transferred to the screw via force application points Q representing resulting abutment portions;

whereby in a cross-sectional shape or an end face configuration of the recess on a plane perpendicular to a center line O1 of the recess and involving the force application points Q, a surface perpendicular force F, perpendicular to a sidewall of the recess at the force application point Q, is oriented in a direction at a driving angle q, representing an angle that is inclined with respect to a tangential direction of the force application point Q with a center on the center line O1, which is expressed as $\theta \leq 0°$ with the driving angle $\theta$ being oriented outward from the tangential direction and assigned to be positive;

in the cross-sectional shape or the end face configuration of the recess on the plane perpendicular to a center line O1 of the recess and involving the force application points Q, the three or more torque transfer portions of the recess being connected to each other via concave circular arc contours having circular arc each with a radius R which form a part of or a whole of sidewalls of the torque transfer portions;

the radius R falling in a range expressed as $0.15\,G \leq R \leq 0.30\,G$ when G represents an outer diameter of the torque transfer portion of the recess, and the center point P1 of the concave circular arc contours each with the radius R being located at a circumference of a circle of a center-point diameter GR falling in a range expressed as $0.85\,G \leq GR \leq 0.95\,G$ with the center line O1 as a center point such that the force application points Q are present on the concave circular arc contours having a diameter in a range from 0.87 G to 0.93 G with the center line O1 as a center point, respectively;

outer circumferential walls of the torque transfer portions of the recess having circular arc configurations on the outer diameter G and the outer circumferential walls and the concave circular arc contours in areas closer to the force application points Q being smoothly connected to each other via circular arcs each with a radius Rc and having the relationship $Rc < (G-GR)/2$.

2. The screw tightening structure according to claim 1, wherein in the cross-sectional shape or the end face configuration of the recess on the plane perpendicular to a center line O1 of the recess and involving the force application points Q, an angle $\theta 1$ between the torque transfer portions of the recess and a separate angle $\theta 2$ of the torque transfer portions satisfy a relationship $0.35 < W < 0.50$ when assumed the torque transfer portions have a ratio $W = \phi 1/(\phi 1 + \phi 2)$.

3. The screw tightening structure according to claim 2, wherein the force application points Q are present in the recess at an opening end portion thereof, wherein the outer diameter G, the radius R, the center-point diameter GR and the angles $\phi 1$ and $\phi 2$ indicate dimensions of the recess at the opening end portion thereof.

4. The screw tightening structure according to claim 3, wherein in the cross-sectional shape or the end face configuration of the mating convex sections on the plane perpendicular to a center line O2 of the mating convex sections and involving the force application points Q, the three or more torque transfer portions of the mating convex sections are connected to each other via concave circular arc contours each in a circle or an ellipse which form a part of or a whole of sidewalls of the torque transfer portions.

5. The screw tightening structure according to claim 3, wherein in the cross-sectional shape or the end face configuration of the mating convex sections on the plane perpendicular to a center line O2 of the mating convex sections and involving the force application points Q, the three or more torque transfer portions of the mating convex sections are connected to each other via concave circular arc contours, each having a radius "r" having a relationship $r \leq R$ relative to the radius R, which form a part of or a whole of sidewalls of the torque transfer portions;

whereby when "g" represents an outer diameter of the torque transfer portions of the mating convex sections, the radius "r" falls in a range expressed as $0.17\,g \leq r \leq 0.33\,g$ under which the center point P2 of the concave circular arc contours with the radius "r" is located on the circumference of a circle of the center-point diameter "gr" falling in a range of $0.94\,g \leq gr \leq 1.06\,g$ with a center on the center line O2; and the concave circular arc contours have edge portions, placed closer to the force application points Q, which reach the force application points Q.

6. The screw tightening structure according to claim 5, wherein the outer diameter "g" of the torque transfer portions of the mating convex sections falls in a range expressed as $0.87\,G \leq g \leq 0.93\,G$.

7. The screw tightening structure according to claim 5, wherein in the cross-sectional shape or the end face configuration of the mating convex sections on the plane perpendicular to a center line O2 of the mating convex sections and involving the force application points Q, the torque transfer portions of the mating convex sections have outer circumferential walls formed in circular arc shape each with the outer diameter "g", respectively, with corner portions at which the outer circumferential walls and the concave circular arc contours intersects each other serving as the force application points Q in abutting contact with sidewall surfaces of the torque transfer portions of the recess.

8. The screw tightening structure according to claim 2, wherein in the cross-sectional shape or the end face configuration of the mating convex sections on the plane perpendicular to a center line O2 of the mating convex sections and involving the force application points Q, the three or more torque transfer portions of the mating convex sections are connected to each other via concave circular arc contours each in a circle or an ellipse which form a part of or a whole of sidewalls of the torque transfer portions.

9. The screw tightening structure according to claim 2, wherein in the cross-sectional shape or the end face configuration of the mating convex sections on the plane perpendicular to a center line O2 of the mating convex sections and involving the force application points Q, the three or more torque transfer portions of the mating convex sections are connected to each other via concave circular arc contours, each having a radius "r" having a relationship $r \leq R$ relative to the radius R, which form a part of or a whole of sidewalls of the torque transfer portions;

whereby when "g" represents an outer diameter of the torque transfer portions of the mating convex sections, the radius "r" falls in a range expressed as $0.17\,g \leq r \leq 0.33\,g$ under which the center point P2 of the concave circular arc contours with the radius "r" is located on the circumference of a circle of the center-point diameter "gr" falling in a range of $0.94\,g \leq gr \leq 1.06\,g$ with a center on the center line O2; and the concave circular arc contours have edge portions, placed closer to the force application points Q, which reach the force application points Q.

10. The screw tightening structure according to claim 9, wherein the outer diameter "g" of the torque transfer portions of the mating convex sections falls in a range expressed as $0.87\,G \leq g \leq 0.93\,G$.

11. The screw tightening structure according to claim 9, wherein in the cross-sectional shape or the end face configuration of the mating convex sections on the plane perpendicular to a center line O2 of the mating convex sections and involving the force application points Q, the torque transfer portions of the mating convex sections have outer circumferential walls formed in circular arc shape each with the outer diameter "g", respectively, with corner portions at which the outer circumferential walls and the concave circular arc contours intersects each other serving as the force application points Q in abutting contact with sidewall surfaces of the torque transfer portions of the recess.

12. The screw tightening structure according to claim 1, wherein in the cross-sectional shape or the end face configuration of the mating convex sections on the plane perpendicular to a center line O2 of the mating convex sections and involving the force application points Q, the three or more torque transfer portions of the mating convex sections are connected to each other via concave circular arc contours each in a circle or an ellipse which form a part of or a whole of sidewalls of the torque transfer portions.

13. The screw tightening structure according to claim 1, wherein in the cross-sectional shape or the end face configuration of the mating convex sections on the plane perpendicular to a center line O2 of the mating convex sections and involving the force application points Q, the three or more torque transfer portions of the mating convex sections are connected to each other via concave circular arc contours, each having a radius "r" having a relationship r≤R relative to the radius R, which form a part of or a whole of sidewalls of the torque transfer portions;
whereby when "g" represents an outer diameter of the torque transfer portions of the mating convex sections, the radius "r" falls in a range expressed as 0.17≤r≤0.33 g under which the center point P2 of the concave circular arc contours with the radius "r" is located on the circumference of a circle of the center-point diameter "gr" falling in a range of 0.94 g≤gr≤1.06 g with a center on the center line O2; and the concave circular arc contours have edge portions, placed closer to the force application points Q, which reach the force application points Q.

14. The screw tightening structure according to claim 13, wherein the outer diameter "g" of the torque transfer portions of the mating convex sections falls in a range expressed as 0.87 G≤g≤0.93 G.

15. The screw tightening structure according to claim 13, wherein in the cross-sectional shape or the end face configuration of the mating convex sections on the plane perpendicular to a center line O2 of the mating convex sections and involving the force application points Q, the torque transfer portions of the mating convex sections have outer circumferential walls formed in circular arc shape each with the outer diameter "g", respectively, with corner portions at which the outer circumferential walls and the concave circular arc contours intersects each other serving as the force application points Q in abutting contact with sidewall surfaces of the torque transfer portions of the recess.

16. The screw tightening structure according to claim 1, wherein the recess has a minimum diameter portion, placed between the plural torque transfer portions, which is inclined toward a bore bottom at an inclination angle $\alpha 1$ of 7° or less so as to approach the center line O1 of the recess; the mating convex section has a minimum diameter portion, placed between the plural torque transfer portions thereof, which is inclined toward a distal at an inclination angle $\alpha 2$ of 7° or less so as to approach the center line O2 of the mating convex section; and a distal end of the minimum diameter portion of the mating convex section is caused to engage a midway of the minimum diameter portion of the recess in the relationships expressed as $\alpha 2 \leq \alpha 1$ and $\alpha 1 - \alpha 2 \leq 3°$ under which the tightening torque is transferred.

17. The screw tightening structure according to claim 16, wherein the maximum diameter portions of the torque transfer portions of the recess which are inclined toward a bore bottom at an inclination angle $\epsilon 1$ of 15° or less so as to approach the center line O1 of the recess; the maximum diameter portions of the torque transfer portions of the mating convex sections are inclined toward a distal end at an inclination angle $\epsilon 2$ of 15° or less so as to approach the center line O2 of the mating convex portions with $\epsilon 1 = \epsilon 2$.

18. The screw tightening structure according to claim 1, wherein the driving angle q falls in a range of $-24.6° \leq \theta \leq 0°$ and the number of the torque transfer portions of each of the recess and the mating convex sections is any one of 3, 4, 5 and 6.

19. A screw including the recess recited in claim 1.

20. A screw tightening tool including the mating convex sections recited in claim 1.

* * * * *